United States Patent

[11] 3,594,638

| [72] | Inventor | Robert H. Quint<br>Dorchester, Mass. |
|---|---|---|
| [21] | Appl. No. | 418,795 |
| [45] | Patented | July 20, 1971 |
| [73] | Assignee | The United Sates of America represented by the Secretary of the Navy |

[54] PHASE MEASURING APPARATUS
1 Claim, 3 Drawing Figs.

[52] U.S. Cl..................................................... 324/85,
324/88, 343/113 R
[51] Int. Cl..................................................... G01r 25/00
[50] Field of Search.......................................... 343/113,
118, 120, 123; 324/85, 82, 88, 83, 68, 70, 84, 86;
250/39, 39.1

[56] References Cited
UNITED STATES PATENTS

| 2,320,908 | 6/1943 | Busignier...................... | 343/118 |
| 2,489,296 | 11/1949 | Koechlin....................... | 324/85 |
| 2,520,693 | 8/1950 | Roberts......................... | 343/113 |

Primary Examiner—Richard A. Farley
Attorneys—R. S. Sciascia and A. L. Branning

ABSTRACT: A two-channel phase difference determination system in which the signal component in one channel is mixed with a local oscillator signal and the same signal component appearing in the second channel is mixed with the output of the first mixer. The resultant is filtered to phase only the local oscillator frequency, which now contains the phase difference information, and is compared with the phase of the local oscillator signal on the screen of a cathode-ray tube.

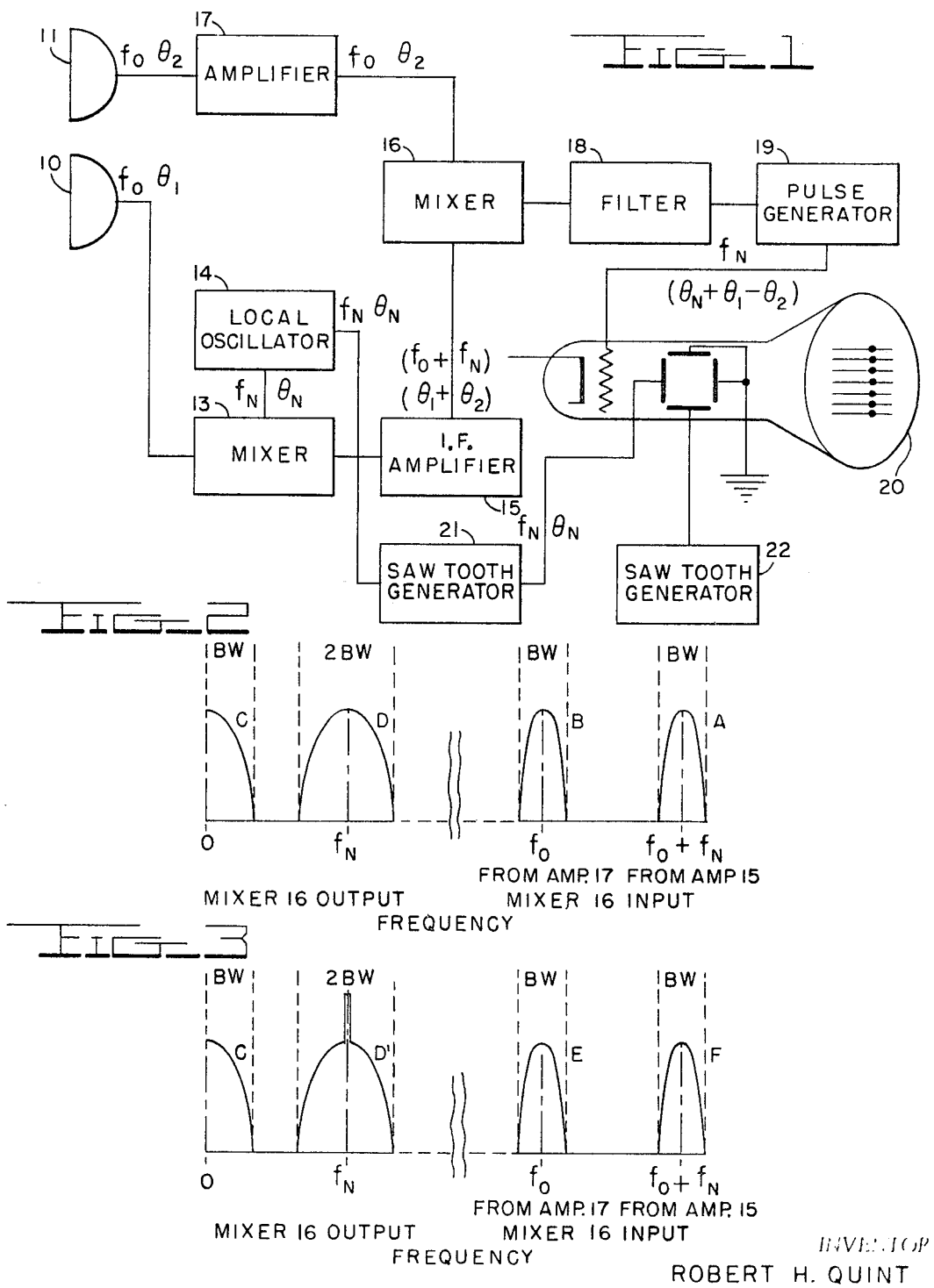

PHASE MEASURING APPARATUS

This invention relates in general to object and/or signal locator systems and in particular to systems for correlating the phase and coherence of two incoming wave energy signals.

In the object and/or signal locator field, a preferred form of azimuth determination, which will cover a sector of azimuth without physical scanning, employs a pair of separated signal pickup devices disposed so that the phase relation between signals arriving at each pickup device from a single source is a measure of the relative bearing of the source. A fuller explanation of this type of azimuth determination, which may be used in either sonar or radar systems, will be found in the copending application of H. L. Saxton, Ser. No. 16,893, filed Mar. 25, 1948, for Sector Scan Indicator now Pat. No. 3,024,441. This copending application discloses a system for determining phase relation. This system requires a pair of signal channels each having a local oscillator and a plurality of mixers to reduce the received signals, which may be of varying frequency, to a single fixed frequency having a phase component representative of the phase difference between the received signals. Also, the two local oscillators must be mixed together to obtain a signal at the fixed frequency having reference phase. Because of the many circuit functions which must be performed, this system is necessarily bulky and expensive and unfortunately complex in construction, operation and maintenance.

Accordingly, it is an object of this invention to provide a simplified phase determination system.

It is another object of this invention to provide a simplified coherent signal detection system.

It is another object of this invention to provide a two channel phase determination and coherent signal detection system requiring a local oscillator and mixer in only one channel.

It is another object of this invention to provide a system for reducing varying frequency signals in a two channel receiver to a single fixed frequency having phase components from both channels requiring only a single local oscillator and two mixers.

Other objects of this invention will become apparent from a better understanding of the invention for which reference is had to the accompanying description and drawings.

In the Drawings:

FIG. 1 is a diagram in simplified form of one embodiment of a signal locator system according to this invention.

FIG. 2 is a graph of amplitude v. frequency showing the band-pass of the several tuned circuits in the input and output of the final mixer for a random noncoherent signal input to the antennae.

FIG. 3 is a graph of amplitude v. frequency showing the band-pass of the several tuned circuits in the input and output of the final mixer for a complex random noncoherent plus random coherent signal input to the antennae.

Briefly, this invention provides a simple two channel phase determination and coherent signal detection system in which the signal component in one channel is heterodyned with a local oscillator and their sum applied to a mixer. The component of the same signal appearing in the other channel is also applied to the mixer. The difference signal at the mixer output will therefore be fixed at the local oscillator frequency regardless of the frequency of the signal applied to the two channels. Also, the difference signal at the mixer output will contain phase components of the local oscillator and of the phase difference of the signal in the two channels.

Referring now to the drawings in more detail.

In FIG. 1 a signal having a frequency $f_o$ is received by the two antennae 10 and 11 which may be directional. The signal $f_o$ received by antenna 10, having a phase angle $\theta_1$ is directed to a mixer stage 13 where it is combined with a signal $f_n$, having an epoch or phase angle $\theta_n$, from a local oscillator 14. The sum of the combined signals, $(f_n+f_o)$ having an epoch or phase angle $(\theta_n+\theta_1)$, is selected by a tuned amplification stage 15 and applied to another mixer stage 16 where it is combined with the signal $f_o$ having a phase angle $\theta_2$ as received by the second antenna 11. Before being applied to the mixer 16, the signal $f_o$ from antenna 11 is preferably fed through an amplification stage 17 as shown, which is tuned to pass a narrow band of frequencies centered at the signal frequency $f_1$, but it is understood that this amplification stage is not essential to the invention and that any device having a band-pass similar to that of amplification stage 15, for reasons which shall appear more fully hereafter, may be substituted. From the heterodyning mixer stage 16, the difference frequency, a new intermediate signal at the oscillator frequency $f_n$ and having a epoch or phase angle $(\theta_n+\theta_1-\theta_2)$, is selected by a filter 18 which will pass only a narrow band of frequencies centered at the oscillator frequency $f_n$. The new intermediate signal is applied to a pulse generator 19 which produces a short pulse at a given point in each cycle of said new intermediate signal relative to the epoch angle thereof. Said pulse is applied to the intensity grid of a cathode ray tube 20. The described pulse serves to produce a bright spot on the screen of the cathode ray tube 20 at the instant the pulse occurs. A sawtooth generator 21 synchronized by the output signal $f_n$ of local oscillator 14 is applied across the horizontal deflection plates in the cathode ray tube to produce a time base sweep on the screen upon which the pulse spot is imposed. A second sawtooth generator 22 is shown applied across the vertical deflection plates in the cathode-ray tube. This second sawtooth generator operates at a frequency lower than that of the first sweep generator and sweeps the time base line with the pulse spot vertically across the screen to produce a raster pattern as shown in FIG. 1 of the drawings. A vertical line made up of pulse spots appears on the raster pattern and this line will bend if the phase difference at the antennae varies during the period of the vertical sweep. It is understood that said second sawtooth generator is not essential to the principle of this invention but that it increases the accuracy of the device by more clearly showing a change in the relative position of the radiating source.

In order to more fully appreciate the operation of this invention certain phenomena associated with the heterodyning of two wave energy signals should be clearly understood. If two signals of different frequency having the form $[2\pi f_o t+\theta_1]$ and $[2\pi f_n t+\theta_n]$ are heterodyned together, the resultant frequencies include their sum $[2\pi(f_n+f_o)t]$ and difference $[2\pi(f_n-f_o)t]$. It can be shown mathematically that the angles $\theta_1$ and $\theta_n$ also add and subtract in the formation of the sum and difference frequencies. These angles $\theta_1$ and $\theta_n$ may be conveniently termed the epoch angles of the two respective signals, i.e., their phase angle when $t=0$. Thus we have a sum frequency in the form $[2\pi(f_n+f_o)t+(\theta_n+\theta_1)]$ and a difference frequency in the form $[2\pi(f_n-f_o)t+(\theta_1-\theta_n)]$. Selecting the sum frequency $[2\pi(f_n+f_o)t+(\theta_n+\theta_1)]$ and, as already discussed above, heterodyning this frequency with the frequency $[2\pi f_o+\theta_2]$ and taking the difference frequency we have a new intermediate frequency $\{2\pi(f_n+f_o)-f_o t+[(\theta_n+\theta_1)-\theta_2]\}$ which simplifies to $[2\pi f_n t+(\theta_n+\theta_1-\theta_2)]$.

As previously stated, the sweep produced by the sweep generator 21 is synchronous with the local oscillator 14. It is obvious therefore that the star of this sweep may be controlled to always occur at a given point in a cycle of the output wave of said oscillator. By adjustment of the necessary triggering voltage for the sweep generator and the pulse generator, both operating at the frequency $f_n$, the bright spot on the sweep produced by pulse generator 19 may be made to coincide with the start of the sweep or any other position on the sweep for the condition of zero phase difference in the signal at the antenna. As a phase difference is introduced at the antennae, the epoch or phase angle of the signal controlling the pulse generator is charged and said spot or line tends to deviate from its described zero phase difference position on the screen. The degree of deviation is directly dependent on the difference between epoch angles of the signals controlling pulse generator 19 and sweep generator 21. This epoch angle difference $\theta_1-\theta_2$ is a function of the difference in distance traveled by the input signals from their common source to the antennae 10 and 11. By calibrating the screen, the visible deviation may be used as an indication of the azimuth of the signal source.

Reference to FIGS. 2 and 3 will aid in the understanding of the description of the coherence determination feature of this invention.

Generally, signals are considered to be phase coherent when the have phase identity. In practice coherent signals are signals generated by a single source in a linear conducting medium and which therefore will arrive at all points in the medium equal-distant from the source in time coincidence. Where the medium is not linear or the reception points are not equal-distant from the source, the signal will arrive at each point at different times, also, such a phase delay may be introduced within the receiving device itself. In these instances of phase delay, the originally coherent signals are still considered to be coherent because a controlled processing of the signals can restore phase identity. Similarly, one of two received coherent signals may be changed in frequency by multiplying or by combining with a third signal and the two signals may still be considered coherent. Basically, coherent signals are signals produced by the same source or by similar sources. Such signals remain coherent provided they undergo no irreversible process which destroys their phase identity. As will be seen, coherence information is particularly advantageous in distinguishing a principal signal over background noise in an energy spectrum. Thus, random noise from a single source will produce coherent signals at properly spaced observation points.

In FIG. 2 an amplitude v. frequency spectrum is shown for noncoherent signals picked up and generated in the system. The random noncoherent output signal of amplifier 15 is represented by curve A having a bandwidth BW at center frequency ($f_o + f_n$) and the corresponding output signal of amplifier 17 by curve B also having a bandwidth BW at center frequency $f_o$. A mixing of frequencies within either of the two curves A and B will produce a difference curve C having a range from zero frequency (due to a combining of frequencies with infinitesimal spacing) to a frequency equal to BW (due to a combining of frequencies at opposite ends of the band-pass of curve A or B). Curve C may be said to describe the "intrachannel noise" which may be in the output of filter 18 if said filtering means is a low pass filter rather than a band-pass filter.

Since for all points in time there is random noise present at all frequencies included in these bandwidths, combining the frequency components within curve A with components within curve B produces a difference curve D centered at frequency $f_n$, substantially as shown, having a bandwidth 2 BW. Twice the single bandwidth is attained due to each pair of signal components separated by an amount numerically equal to $f_n$ mixing to produce an output centered about $f_n$. That is, a frequency component at the low edge of curve A will combine with one at the upper edge of curve B to produce an output $f_n$-BW. Similarly a component at the high edge of curve A and one at the low edge of curve B will combine to produce an output of $f_n$+BW. Other combinations of the random frequency components of curves A and B will combine to produce the curve between the limits of the 2 BW bandwidth of curve D. The curve D may be said to describe the "interchannel noise" in the output of filter 18. A similar frequency spectrum will occur centered about $2f_o + f_n$ representing the sum of A and B. This sum frequency spectrum need not be considered in the present discussion since it will not pass the described filter 18.

In FIG. 3, an amplitude v. frequency spectrum is shown in which a coherent signal has been added to the noncoherent signal. The complex random noncoherent plus random coherent output signal of amplifier 15 is represented by curve F similar to curve A above and the corresponding output signal of amplifier 17 by curve E similar to curve B above. When the frequency components within curve F are combined with components within curve E a difference curve D' centered at $f_n$ having a bandwidth 2 BW plus a spike at $f_n$ is produced. The 2 BW bandwidth is attained in accordance with the discussion of random noncoherent signals above. The spike represents the reinforcement of all the coherent signal components present in curve E and F since the respective coherent component under each curve comes from instantaneously equal frequencies although they may be randomly varying. Therefore, each frequency component of the coherent signal in curve E may be said to have a corresponding component in curve F located in the same relative position within the band-pass. Each pair of components so spaced will produce a difference output at $f_n$ and these outputs will be stacked producing the spike at the center of curve D' as shown. Thus the coherent signal is reinforced at a single frequency whereas the noncoherent signal is scattered over a frequency range of 2 BW. By selecting with the sharply tuned filter 18 the signal occurring only at $f_n$ and observing its amplitude, it becomes possible to detect even a weak coherent signal in the presence of a relatively larger noise background. The relative height of the spike provides a measure of the degree of coherence as well as the strength of the coherent signal. However since the coherent signal represented by the spike has the phase $\theta_n + \theta_1 - \theta_2$, a better measure of the degree of coherence is obtained by the cathode ray tube display described above than by simply measuring its amplitude.

Thus it has been shown that this invention provides a system for detecting the presence and determining the direction of sources of coherent signals as well as a system for the quantitative measure of the degree of coherence between any two signals.

While the device disclosed in detail in the description of this invention provides for recovering the sum of the two frequencies in the first described heterodyne stage and the difference frequency in the second heterodyne stage, it is understood by those skilled in the art that the difference of the two frequencies in the first described heterodyne stage may be recovered in a like manner if this is desired.

Further it is understood that the pickup devices generally described in this invention as antennae may be of any suitable type or design in accordance with the operation of this type of device in any object and/or signal locating system.

The invention described herein may be manufactured and used by or for the Government of the United States of America for governmental purposes without the payment of any royalties thereon or therefor.

I claim:

1. An apparatus for measuring phase difference between two input signals of the same frequency with an unknown phase relation therebetween comprising first and second frequency selective input channels each operative to receive input signals of a selected first frequency; said first input channel comprising an oscillator operative to provide an output signal of a reference frequency and phase and first signal mixing means operative to combine the input signal to said first channel means and the output signal of said oscillator; second signal mixing means; means connecting the output of said second input channel to said second signal mixing means; first band-pass means connecting the output of said first signal mixing means in said first input channel means to said second signal mixing means, said first band-pass means being operative to pass a narrow band of frequencies having a center frequency separated from said first frequency by said reference frequency, a cathode ray tube type display means having an intensity grid and beam deflection means; amplitude sensitive pulse generating means connected to said intensity grid of said display means; second band-pass means connecting the output of said second mixing means to said pulse generating means and operative to control the output of said pulse generating means and sweep generating means connected to said deflection means and to said oscillator and operative to produce a sweep in synchronism with the output signal of said oscillator.